(12) United States Patent
Brundridge et al.

(10) Patent No.: US 8,639,963 B2
(45) Date of Patent: Jan. 28, 2014

(54) SYSTEM AND METHOD FOR INDIRECT THROTTLING OF A SYSTEM RESOURCE BY A PROCESSOR

(75) Inventors: Michael A. Brundridge, Georgetown, TX (US); Paul T. Artman, Austin, TX (US); Bryan Krueger, Austin, TX (US); Abhishek Mehta, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 2009 days.

(21) Appl. No.: 11/122,614

(22) Filed: May 5, 2005

(65) Prior Publication Data

US 2006/0253633 A1 Nov. 9, 2006

(51) Int. Cl.
*G06F 11/00* (2006.01)

(52) U.S. Cl.
USPC ............................................................ 714/3

(58) Field of Classification Search
USPC ................................ 714/3; 700/293; 702/132
See application file for complete search history.

(56) References Cited

U.S. PATENT DOCUMENTS

| | | | |
|---|---|---|---|
| 5,307,003 A * | 4/1994 | Fairbanks et al. ............. | 323/222 |
| 6,304,978 B1 | 10/2001 | Horigan et al. ............... | 713/322 |
| 6,470,238 B1 | 10/2002 | Nizar et al. ................... | 700/299 |
| 6,535,798 B1 | 3/2003 | Bhatia et al. .................. | 700/293 |
| 6,701,272 B2 | 3/2004 | Cooper et al. ................ | 702/132 |
| 6,826,704 B1 | 11/2004 | Pickett ......................... | 713/320 |
| 7,051,215 B2 * | 5/2006 | Zimmer et al. ............... | 713/300 |
| 7,051,221 B2 * | 5/2006 | Clabes et al. ................ | 713/320 |
| 7,120,021 B2 * | 10/2006 | Hamman ...................... | 361/699 |
| 7,124,321 B2 * | 10/2006 | Garnett et al. .................. | 714/14 |
| 7,237,130 B2 * | 6/2007 | Lee .............................. | 713/323 |
| 2003/0084088 A1 * | 5/2003 | Shaffer ......................... | 709/104 |
| 2003/0217296 A1 | 11/2003 | Ma ............................... | 713/300 |
| 2004/0148528 A1 | 7/2004 | Silvester ...................... | 713/300 |
| 2005/0172157 A1 * | 8/2005 | Artman et al. ............... | 713/300 |
| 2005/0198523 A1 * | 9/2005 | Shanbhag et al. ........... | 713/200 |
| 2006/0253633 A1 * | 11/2006 | Brundridge et al. .......... | 710/104 |

* cited by examiner

*Primary Examiner* — Scott Baderman
*Assistant Examiner* — Jigar Patel
(74) *Attorney, Agent, or Firm* — Baker Botts L.L.P.

(57) ABSTRACT

A system and method for indirect throttling of a system resource by a processor are disclosed. An information handling system includes a chassis that receives modular components, a processor disposed in the chassis and a system resource in communication with the processor. A management module associated with the chassis generates a throttle signal that throttles operation of the processor in response to receiving an alarm such that the processor reduces the throughput of the system resource.

23 Claims, 5 Drawing Sheets

SYSTEM AND METHOD FOR INDIRECT THROTTLING OF A SYSTEM RESOURCE BY A PROCESSOR

TECHNICAL FIELD

The present disclosure relates in general to information handling systems, and more particularly to a system and method for indirect throttling of a system resource by a processor.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Today, information handling systems, such as servers and storage subsystems, use an increasing amount of power and resources. As computing and power requirements continue to increase, users are looking for ways to pack more computing power into smaller spaces while at the same time saving money, conserving energy, and having flexibility. For example, companies are migrating towards high density server applications or modular computing systems, such as blade servers and brick servers, instead of conventional U-sized servers (a U is a standard unit of measure for designating the height in computer enclosures and rack cabinets where 1U equals approximately 1.75 inches). The modular systems may include modular components such as blade servers, power supplies, cooling fans, disk drives and input/output (I/O) devices that can be easily installed in or removed from the system as individual modules.

Information handling systems that include multiple servers within a single server rack cabinet generally require additional cooling in order to account for the heat generated by the operation of the blade servers. Therefore, additional cooling fans or cooling fans having greater cooling capacity may be needed in order to prevent the servers from overheating due to the increased heat load of the processors in each of the servers. Because modular components may be easily installed in and removed from a server chassis, a user may not completely fill the chassis with the modular components, which results in the chassis having one or more empty sections. The empty sections adversely affect the cooling of the installed modular servers because air, like water, flows in the path of least resistance. For example, the majority of the cooling air flows in the empty sections and not through the installed modular servers when the cooling fans pull cooling air into the server chassis. Therefore, the installed modular servers do not receive adequate cooling and the operating temperature of one or more of the modular servers increases.

Each server in the information handling system may include one or more sensors that measure the operating temperature of the various devices in the server. The sensors typically are mounted on the circuit board adjacent to the devices and thus, depend on the air flowing over the devices to determine operating temperatures. However, in situations where the internal temperature of the devices rise above the ambient temperature in the system, such as when the airflow is altered by an empty section in the chassis, the sensor may report a temperature that is lower than the actual operating temperature of the devices. If the operating temperature continues to increase, the system may shut down without any warning to the users because the sensors are reporting lower temperatures. Furthermore, the overheating may result in system down time and less efficient operation.

SUMMARY

In accordance with the present disclosure, the disadvantages and problems associated with controlling component temperature in an information handling system have been substantially reduced or eliminated. In a particular embodiment, a management module generates a throttle signal in response to receiving an alarm and throttles operation of a processor such that the processor reduces throughput of a system resource in communication with the processor.

In accordance with one embodiment of the present disclosure, an information handling system includes a chassis that receives modular components, a processor disposed in the chassis and a system resource in communication with the processor. A management module associated with the chassis generates a throttle signal that throttles operation of the processor in response to receiving an alarm such that the processor reduces throughput of the system resource.

In accordance with another embodiment of the present disclosure, a method for indirect throttling of a system resource by a processor includes receiving a throttle signal at a processor disposed in a chassis if a management module associated with the chassis receives an alarm. The throttle signal throttles operation of the processor such that the processor reduces throughput of a system resource in communication with the processor.

In accordance with a further embodiment of the present disclosure, a system for indirect throttling of a system resource by a processor includes a modular chassis having a plurality of modular components and a plurality of blade servers installed therein. A management module is associated with the chassis and operably coupled to the blade servers and the modular components. The management module operable generates a throttle signal in response to receiving an alarm from one of the blade servers or one of the modular components. A processor in communication with a system resource and a controller in communication with the processor are disposed in each of the blade servers. The controller receives the throttle signal from the management module and throttles operation of the processor such that the processor reduces throughput of the system resource.

Important technical advantages provided by certain embodiments of the present disclosure include an information handling system having the ability to reduce throughput of any system resources communicating with an associated processor. The information handling system may include one or more computing modules, such as blade servers, installed in a chassis. The computing modules typically include one or two processors in communication with system resources such as memory and various peripheral devices. If cooling in the information handling system is altered, the computing components in the computing modules may generate too much heat and cause a system failure. A management module associated with the chassis may generate a throttle signal when an alarm is received based on the altered cooling conditions and communicate the throttle signal to the processor in the computing modules. The throttled processors have a reduced operating speed and therefore, request and receive information from the system resources at a reduced frequency, which reduces the throughput of the system resources.

Another important technical advantage provided by certain embodiments of the present disclosure includes an information handling system that dissipates less heat during throttled operation. If a management module associated with a chassis in the information handling system determines that the cooling conditions of the system have been altered, the management module throttles one or more of the computing modules installed in the chassis. The throttle signal generated by the management module is communicated to processors in the selected computing modules such that the processors operate at a reduced speed. The processors also reduce the throughput of any system resources in the computing modules by requesting and receiving information from the system resources at a reduced frequency. The reduced operating speed of the processors and the reduced throughput of the system resources decrease the operating temperatures of the processors and the system resources such that the ambient temperature rise through the computing modules also decreases. System failures due to overheating, therefore, will e reduced or even eliminated.

All, some, or none of these technical advantages may be present in various embodiments of the present disclosure. Other technical advantages will be readily apparent to one skilled in the art from the following figures, descriptions, and claims.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

A conventional information handling system that includes multiple blade servers may use one or more sensors to monitor operating conditions, such as temperature, of devices mounted on the server circuit boards. In operation, the sensors monitor operating temperature by measuring the temperature of the cooling air that flows over both the devices and the sensors. The temperature readings provided by the sensors may be used by a management module associated with the system to control cooling fans in order to reduce the operating temperature of the processor and other devices mounted on the circuit boards if the measured temperatures rise above a certain level. The sensors, however, typically do not provide an accurate measure of the operating temperatures of the devices because the sensors are not located on the devices and depend on the airflow over the devices to measure the ambient temperature associated with the devices. If one of the modular components in the system is removed, the airflow in the system may change such that the air circulates in the empty space instead of flowing through the installed servers. Since the sensors use airflow to determine operating temperature, the sensors may provide inaccurate results and the devices may overheat, which may cause the system to unexpectedly shut down. Additionally, the response time of the sensor may be much slower than the response time of the component due to fast transient temperatures associated with a component having high heat flux.

The present disclosure provides a system and method for indirect throttling of system resources mounted on a circuit board by a processor such that the system resources do not overheat. In one embodiment, a management module associated with the chassis detects when one of the modular components has a failure or has been removed from the chassis and communicates a throttle signal to one or more of the installed servers. The throttle signal instructs the processor to reduce its operating speed. When the operating speed of the processor is reduced, the processor requests and receives information from the system resources (e.g., memory and peripheral devices) at a reduced frequency such that the system resources are indirectly throttled by the processor, which reduces the power consumption and operating temperature of the system resources. The ability to indirectly throttle the system resources prevents system failures due to overheating in the information handling system. Additionally, throttling of the system resources reduces throughput in the server, which reduces ambient temperatures in the system.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, a server, or any other suitable device and may vary in size, shape, performance, functionality, and price. The information handling system may include random access memory (RAM), one or more processing resources such as a central processing unit (CPU) or hardware or software control logic, read only memory (ROM), and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
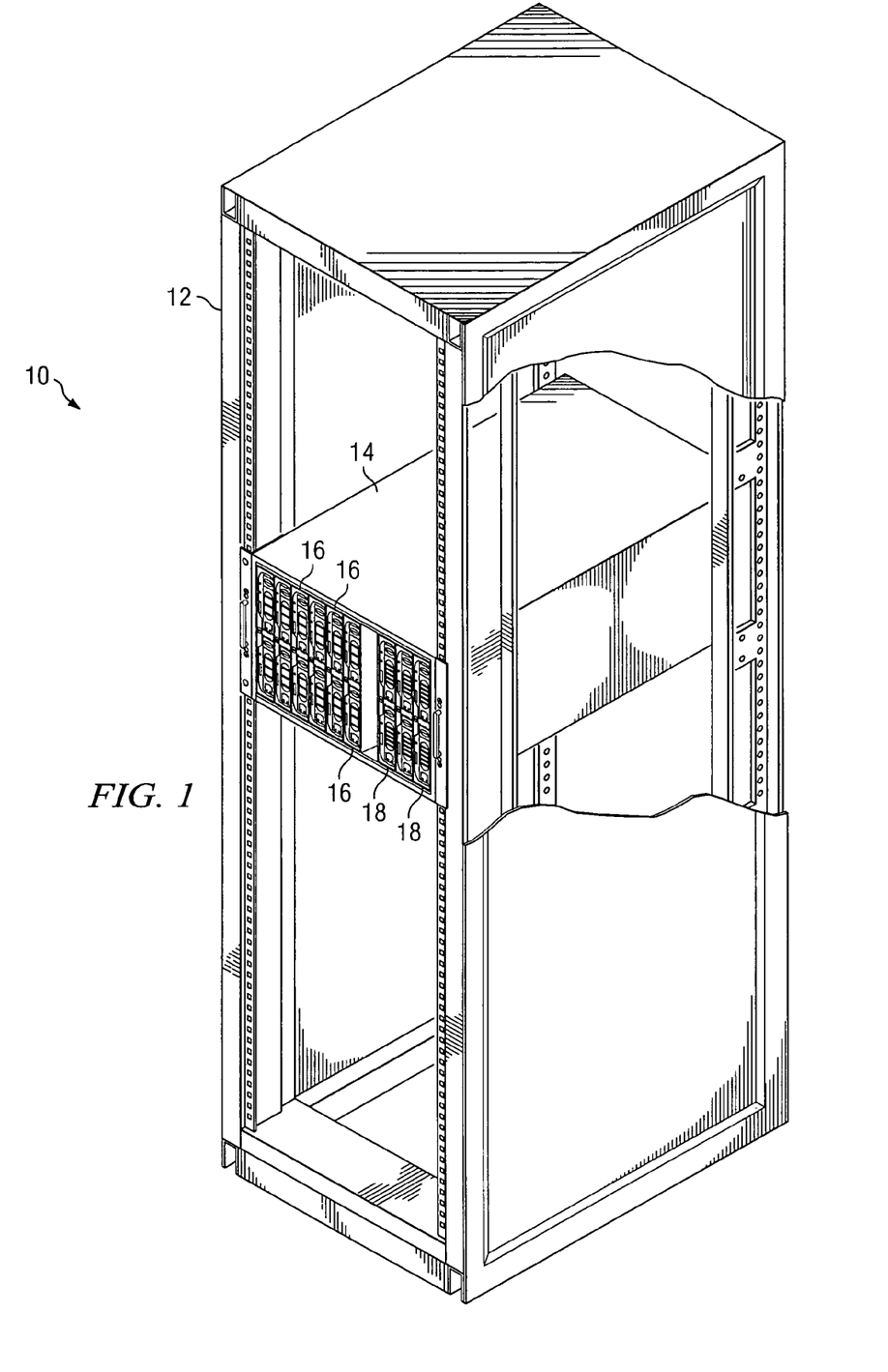
FIG. 1 illustrates a perspective diagram of an example information handling system in accordance with teachings of the present disclosure.

FIG. 1 illustrates a perspective diagram of information handling system 10 including rack structure 12, modular chassis 14, computing modules 16, and blank modules 18. Information handling system 10 shown in FIG. 1 represents one configuration for rack structure 12, modular chassis 14, computing module 16, and blank modules 18. Information handling system 10 may be utilized in a computing center such as those used in any computer hardware intensive environment. In the embodiment shown in FIG. 1, rack structure 12 of information handling system 10 is a 42U rack structure and modular chassis 14 is a 7U sized chassis thereby allowing rack structure 12 to receive up to six of 7U modular chassis 14 disposed therein. In other embodiments, rack structure 12 may accept any combination and number of U-sized modular chassis 14 such that the total height of modular chassis 14 do not exceed the maximum height of rack structure 12. In a further embodiment, modular chassis 14 may be a stand-alone information handling system where rack structure 12 is not needed to house modular chassis 14.

Figure 2A:
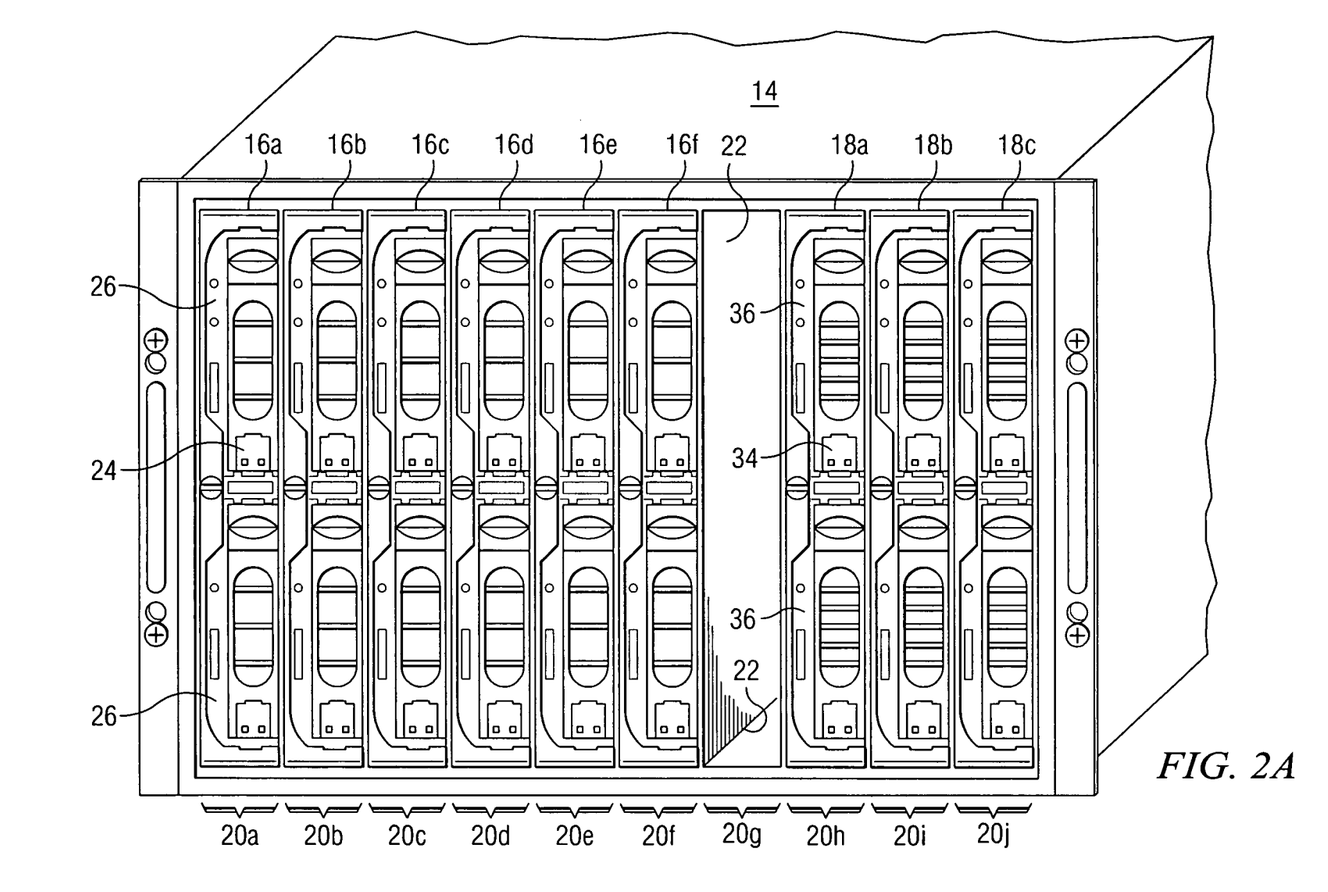
FIG. 2A illustrates a front perspective view of an example modular chassis in accordance with teachings of the present disclosure.

FIG. 2A illustrates a front perspective view of modular chassis 14 including an example configuration for computing modules 16 and blank modules 18. In the illustrated embodiment, modular chassis 14 is of a 7U size and includes ten slots 20a, 20b, 20c, 20d, 20e, 20f, 20g, 20h, 20i and 20j (generally referred to as slots 20). Modular chassis 14 is operable to accept in slots 20a-20j up to ten computing modules 16, up to ten blank modules 18, or up to ten of any combination of computing modules 16 and blank modules 18. In the illustrated embodiment, computing modules 16a-16f are respectively installed in slots 20a-20f, slot 20g is empty and blank modules 18a-18c are respectively installed in slots 20h-20j. In another embodiment, modular chassis 14 may be of a different size than 7U and may include more than ten or less than ten slots to accept any combination of computing modules 16 and/or blank modules 18.

Computing modules 16 are modular components, such as blade servers and brick servers, that include computing components and may be easily installed or removed within modular chassis 14. In the embodiment shown in the FIGURES, computing module 16 is a blade server. A blade server is a thin, ultra-dense, modular electronic circuit board that contains one or more processors, associated memory and various peripheral devices. Server blades are complete computing systems due to the inclusion of processors, memory, and storage and network functionality on a single circuit board. Computing module 16 further includes housing 22 which encloses the necessary components of computing modules 16. Housing 22 further includes a front section 24, which includes handles 26 that enables a user to install and remove computing modules 16 in and out of slots 20 in modular chassis 14.

Blank modules 18 do not include any of the electronic and/or computing components in computing module 16. In the embodiment shown in the FIG. 2A, blank modules 18 only include housing 22 and do not include any internal components such as a processor, memory, or circuit board. Blank modules 18 include front section 34 and may also include handles 36. Front section 34 and handles 36 may be different from front section 24 and handles 26 of computing module 16 so that a user can easily determine upon viewing whether computing module 16 or blank module 18 is installed in slot 20. For instance, front section 24 may have a different hole pattern than front section 34 and handles 36 may be a different color than handles 26. Therefore, a user only seeing front sections 24 and 34 can quickly determine the type of module installed in each of slots 20. Although blank module 18 has been described as housing 22 including front section 36, in alternate embodiments blank module 18 may only be a front section and not include the full housing. In order to provide the desired functionality of acting as a substitute for computing module 16, blank module 18 can be of any type so long as blank module 18 has a large enough body and/or area to allow for proper and adequate air flow through modular chassis 14.

As illustrated in FIG. 2A, either one of computing module 16 or blank module 18 has been removed from slot 20g. Removal of the module in slot 20g creates an empty space in modular chassis 14 and changes the airflow through modular chassis 14. Typically, cooling air generated by one or more cooling fans (as shown below in FIG. 2B) flows through modular chassis 14 and over the components in computing modules 16. When one or more of computing modules 16 and/or blank modules 18 is removed, the cooling air flows through the empty space because the cooling air follows the path of least resistance, here empty slot 20g. Installed computing modules 16a-16f, therefore, do not receive adequate cooling and may overheat causing one or more of computing modules 16 to unexpectedly shut down.

As described more fully below, the present disclosure provides a system and method for indirectly throttling a system resource in one or more of computer modules 16 by using the corresponding processors. If one of computing modules 16 or blank modules 18 is removed from modular chassis 14, a management module associated with modular chassis 14 may detect the empty space when an alarm is received (e.g., slot 20g as illustrated in FIG. 2A) and throttle the processor in one or more of computing modules 16. The throttled processors have a reduced operating speed, and thus request and receive information from system resources at a lower rate. The throttled processors, therefore indirectly throttle the system resources and lower the system resources power draw, which lowers the operating temperature of the system resources. In addition, the reduced operating speeds of both the processor and the system resources reduces ambient temperature in associated computing modules 16 such that system failures due to overheating may be reduced or even eliminated.

Figure 2B:
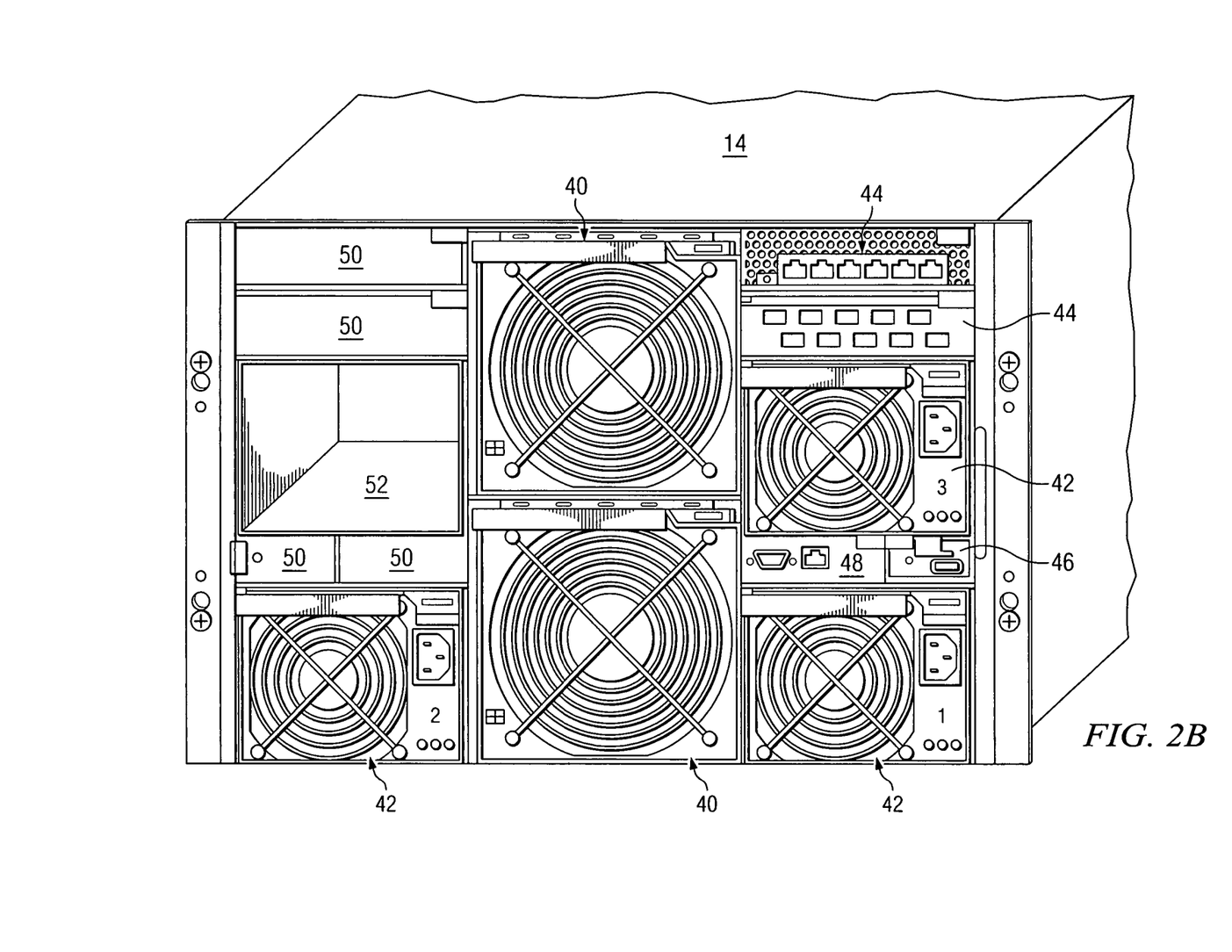
FIG. 2B illustrates a rear perspective view of an example modular chassis in accordance with teachings of the present disclosure.

FIG. 2B illustrates a rear perspective view of modular chassis 14 including an example configuration for various modular components. In the illustrated embodiment, modular chassis 14 houses multiple modular components, including, but not limited to, cooling fans 40, power supplies 42, I/O devices 44, keyboard, video, mouse (KVM) module 46, management module 48 and blank module 50. These modular components communicate with any computing module 16 installed in modular chassis 14. I/O devices 44 may be a Fibre-Channel pass-through, an Ethernet pass-through, an Ethernet switch module or any other suitable devices that provides input and output capability for computing modules 16 installed in modular chassis 14. KVM module 46 may be used to connect computing modules 16 to a single mouse, keyboard and video monitor in a point-to-point topology. Blank modules 50, like blank modules 18 illustrated in FIG. 2A, do not include any of the electronic and/or computing components in, for example, cooling fans 40, power supplies 42, I/O modules 44, KVM module 46 and management module 48.

Management module 48 may be a remote access controller that performs power management functions and monitors system operating conditions for modular chassis 14. For example, management module 48 may be in communication with the other modular components described above and a baseboard management controller (BMC) mounted to the circuit board of each computing module 16. Each BMC may interface with the processor and any sensors mounted on the circuit board of corresponding computer module 16. The BMC may receive signals from the sensors on the circuit board and in turn may send signals to management module 48. The signals received from the sensors may include information related to the operating conditions in computing module 16. The BMCs in each of computing modules 16 may communicate the received information to management module 48.

Additionally, management module 48 may be able to independently detect operating conditions associated with the modular components installed in the chassis. For example, management module 48 may be able to detect if one of the modular components (e.g., computing modules 16, blank modules 18, cooling fans 40, power supplies 42, I/O modules 44, KVM module 46 and blank modules 50) have been removed from modular chassis 14 and may be able to monitor fan speeds of the cooling devices (e.g., cooling fans 40 and the fans in power supplies 42) installed in modular chassis 14. If management module 48 detects an empty space in modular chassis 14 or determines that the fan speed for at least one of the cooling devices is too low, management module 48 may communicate a signal to one or more of computing modules 16 that throttles the processor in the corresponding computing module.

When computing modules 16 are installed in modular chassis 14, computing modules 16 interface with a midplane (not expressly shown). The midplane may be a circuit board and may include passive components such as connectors and resistors. Furthermore, the midplane may include connectors on the side facing computing modules 16 as well as the side opposite from computing modules 16 so that computing modules 16 may interface with other modular components, such as cooling fans 40, power supplies 42, I/O modules 44, KVM module 46 and management module 48.

In FIG. 2A, modular chassis 14 includes computing modules 16a-16f respectively installed in slots 20a-20f and blank modules 18a-18c respectively installed in slots 20h-20j. Slot 20g does not contain computing module 16 or blank module 18 and, therefore, is empty. Additionally, one of power supplies 42 has been removed from modular chassis 14 to create empty space 52 as shown in FIG. 2B. When computing module 16 is operating, it generates heat and must be cooled so that it does not overheat. Cooling fans 40, in addition to the fans in power supplies 42, provide the cooling air for computer modules 16. Although the embodiments of FIGS. 2A and 2B include space for two cooling fans 40 and four power supplies 42, in alternate embodiments, modular chassis 14 may include space for more than two or less than two cooling fans and more than four or less than four power supplies. In operation, cooling fans 40 and the fans in power supplies 42 pull in cooling air through front section 24 of computing modules 16 and front section 34 of blank modules 18 so that the cooling air may pass over computing components in computing modules 16 to cool the components and prevent computing modules 16 from overheating. Blank modules 18 act as substitutes for computing modules 16 that are absent from modular chassis 14 and ensure that cooling air properly flows through modular chassis 14.

However, as illustrated in FIGS. 2A and 2B, empty spaces in modular chassis 14 may cause cooling problems because of changes in the pressure boundary conditions that control airflow through modular chassis 14. The increased open area of empty slot 20g and/or empty space 52 causes decreased air flow through the remaining slots 20a-20f and 20h-20j and, therefore, reduced cooling in those areas. Since air, much like water or electricity, follows the path of least resistance, the majority of the cooling air travels through slot 20g and empty space 52.

Because the majority of the cooling air flows through empty slot 20g and empty space 52, computing module 16f installed in slot 20f may receive some cooling air but computing modules 16a-16e respectively installed in slots 20a-20e may receive little or no cooling air. The inadequate cooling air supplied to computing modules 16a-16f may cause the operational temperatures of the processor and system resources to increase. The sensors included in computing modules 16 may detect the increasing operating temperature and communicate a signal to management module 48. The sensors, however, may be unable to adequately track the temperature increase because the sensors measure operating temperature based on airflow over the devices. When one of the modular components is removed from modular chassis 14, the air flow over the devices may be significantly reduced. Therefore, the operating temperature of computing modules 16 continues to increase because of inadequate cooling.

As the operating temperature of computing modules 16 continue to increase, management module 48 may increase the operational speed of cooling fans 40 in order to generate more cooling air but the additional cooling air may not achieve the desired effect of lowering the operating temperature of computing modules 16. When cooling fans 40 reach their maximum operational speeds and the operating temperatures of computing modules 16 remain too high, computing modules 16 may shut down to prevent system failure due to overheating. The shut down happens immediately without any warning to the user of information handling system 10 and results in ungraceful shutdowns, loss of data, and increased down-time.

The overheating of computing modules 16 in modular chassis 14 can be prevented by throttling the processors in one or more of computing modules 16 such that any system resources interfaced with the processors are indirectly throttled. For example, when the processors are throttled the operating speed of the processors decreases. The processors, therefore, communicate commands to and receive information from the system resources at a decreased rate. Since throughput of the system resources is reduced, the operating speed of the system resources is also reduced, which decreases the operating temperature of the system resources. Additionally, the operating temperature of the throttled processors is reduced. Since the processors and the system resources have lower operating speeds and, thus, lower operating temperatures, the ambient temperature in computing modules 16 will also be reduced. By reducing the ambient temperature, the possibility that computing modules 16 will shut down due to a system failure caused by overheating may be reduced and even eliminated.

Figure 3:
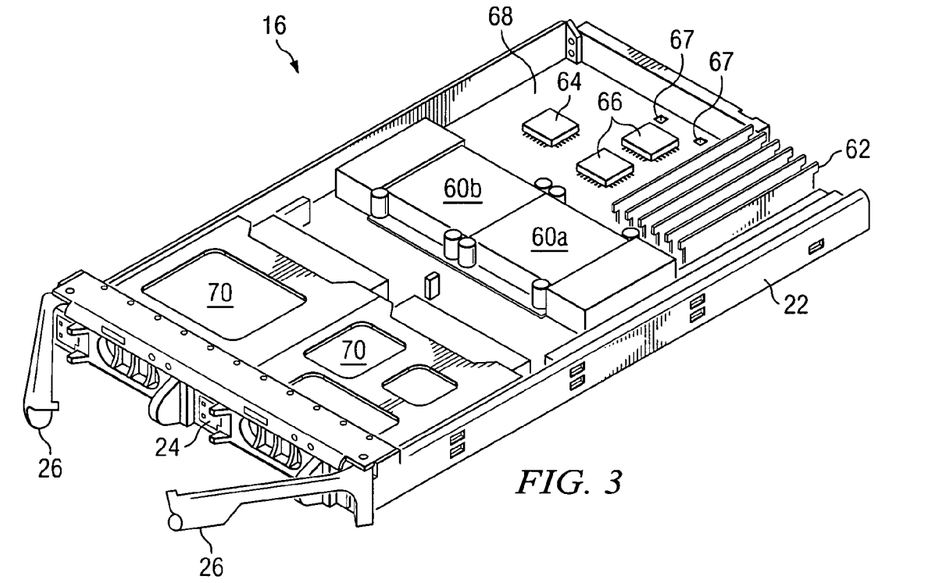
FIG. 3 illustrates a top perspective view of a computing module included in a modular chassis in accordance with teachings of the present disclosure.

FIG. 3 illustrates a top perspective view of computing module 16 including an example configuration for various computing components. In the illustrated embodiment, computing module 16 includes processors 60a and 60b, memory 62, baseboard management controller (BMC) 64, peripheral devices 66 and sensors 67 mounted on circuit board 68. Computing module 16 may further include modular components, such as hard disk drives (HDDs) 70a and 70b that respectively interface with processors 60a and 60b mounted on circuit board 68. In other embodiments, HDDs 70 may interface with both of processors 60. HDDs 70 may store the operating system and other programs that are executable by processors 60.

Processors 60 may be microprocessors, microcontrollers, digital signal processors (DSP) or any other digital or analog circuitry configured to execute processing instructions stored in memory 62. Memory 62 may be random access memory (RAM), electrically erasable programmable read-only memory (EEPROM), a PCMCIA card, flash memory, or any suitable selection and/or array of volatile or non-volatile memory. BMC 64 may be a microprocessor, microcontroller, DSP or any other digital or analog circuitry configured to perform inventory, monitoring, logging, and recovery control functions independent of processors 60. Peripheral devices 66 may be a chip set associated with one or both of processors 60, a video adapter, an audio adapter, a communication device or an other device that interfaces with one or both of processors 60 to add functionality to computing module 16. Memory 62 and peripheral devices 66 may generally be referred to as system resources, which are accessible by processors 60 when computing module 16 is operational. Although, computing module 16 as illustrated in FIG. 3 includes memory 62 and peripheral devices 66, other embodiments of computing module 16 may include any configuration of memory modules and less than two or more than two peripheral devices.

In one embodiment, sensors 67 may be mounted on circuit board 68 to monitor various operating conditions associated with computing module 16. Sensors 67 are hardware components that measure operating characteristics including, but not limited to, temperature, current, voltage, power supplies, fan speed, memory errors, or any other appropriate operating parameters that affects performance of computing module 16. For instance, sensors 67 may measure temperature levels for memory 62 and peripheral devices 66 and, therefore, report ambient temperature for computing module 16. Sensors 67 may be linear, non-linear, discrete, or threshold sensors.

Sensors 67 may be located adjacent system resources, such as memory 62 and/or one or more of peripheral devices 66, in order to measure various operating conditions associated with memory 62 and/or peripheral devices 66. For example, sensors 67 may measure operating temperatures associated with memory 62 and peripheral devices 66. Sensors 67, however, do not provide an accurate temperature for memory 62 and peripheral devices 66 because sensors 67 are mounted on circuit board 68 adjacent to memory 62 and peripheral devices 66 such that sensors 67 reply on airflow through computing module 16 to measure temperature. When one or more of the modular components is removed from modular chassis 14 and/or one or more of the cooling devices has failed, the path of the cooling air flowing from front to back through modular chassis 14 is altered such that the air flow over both the system resources and the sensors 67 may be reduced. Sensors 67 measure operating temperature of memory 62 and peripheral devices 66 by measuring the temperature of the air flowing through computing module 16. Since the airflow through computing module 16 may be reduced, sensors 67 may not provide an accurate temperature reading because the same amount of air may not be flowing over memory 62 and/or peripheral devices 66 and sensors 67.

The present disclosure prevents the operating temperature in computing module 16 from increasing by indirectly throttling system resources (e.g., memory 62 and/or peripheral devices 66). When management module 48 (as illustrated in FIG. 2B) receives an alarm indicating that the temperatures measured by sensors 67 in one or more of computing modules 16 have reached a maximum level, one or more of modular components has been removed from modular chassis 14 and/ or one or more of the cooling devices has failed, management module 48 determines the position in modular chassis 14 of the overheated computing module, empty space and/or the failed cooling device. In one embodiment, management module 48 may throttle one or both of processors 60 all installed computing modules 16. In another embodiment, management module 48 may throttle a subset of installed computing modules 16 based on the number and position of empty spaces and/or failed devices in modular chassis 14. For example, modular chassis 14 may include empty slot 20g created by removing computing module 16 or blank module 18 and empty space 52 created by removing power supply 42 as illustrated in FIGS. 2A and 2B. Management module 48 may receive an alarm generated by sensors (not expressly shown) associated with modular chassis 48 indicating the position of empty slot 20g and empty space 52 within modular chassis. Based on the determined positions of the empty spaces, management module 48 may, for example, determine to throttle processors 60 in computing modules 16a-16f.

In one embodiment, management module 48 throttles processors 60 by communicating a throttle signal to BMC 64 in each of selected computing modules 16. BMC 64 then throttles one or both of processors 60 by asserting, for example, an externally driven throttle signal (e.g., FORCEPR# on an Intel processor). When processors 60 are throttled, the operating speed is reduced and processors 60 request and receive information from memory 62 and/or peripheral devices 66 at a reduced rate. Since processors 60 demand less of memory 62 and/or peripheral devices 66 when throttled, utilization of memory 62 and peripheral devices 66 declines and the operating temperature of the devices will decrease. Therefore, processors 60 effectively reduce operating speed of memory 62 and/or peripheral devices 66 such that the devices are indirectly throttled.

Figure 4:
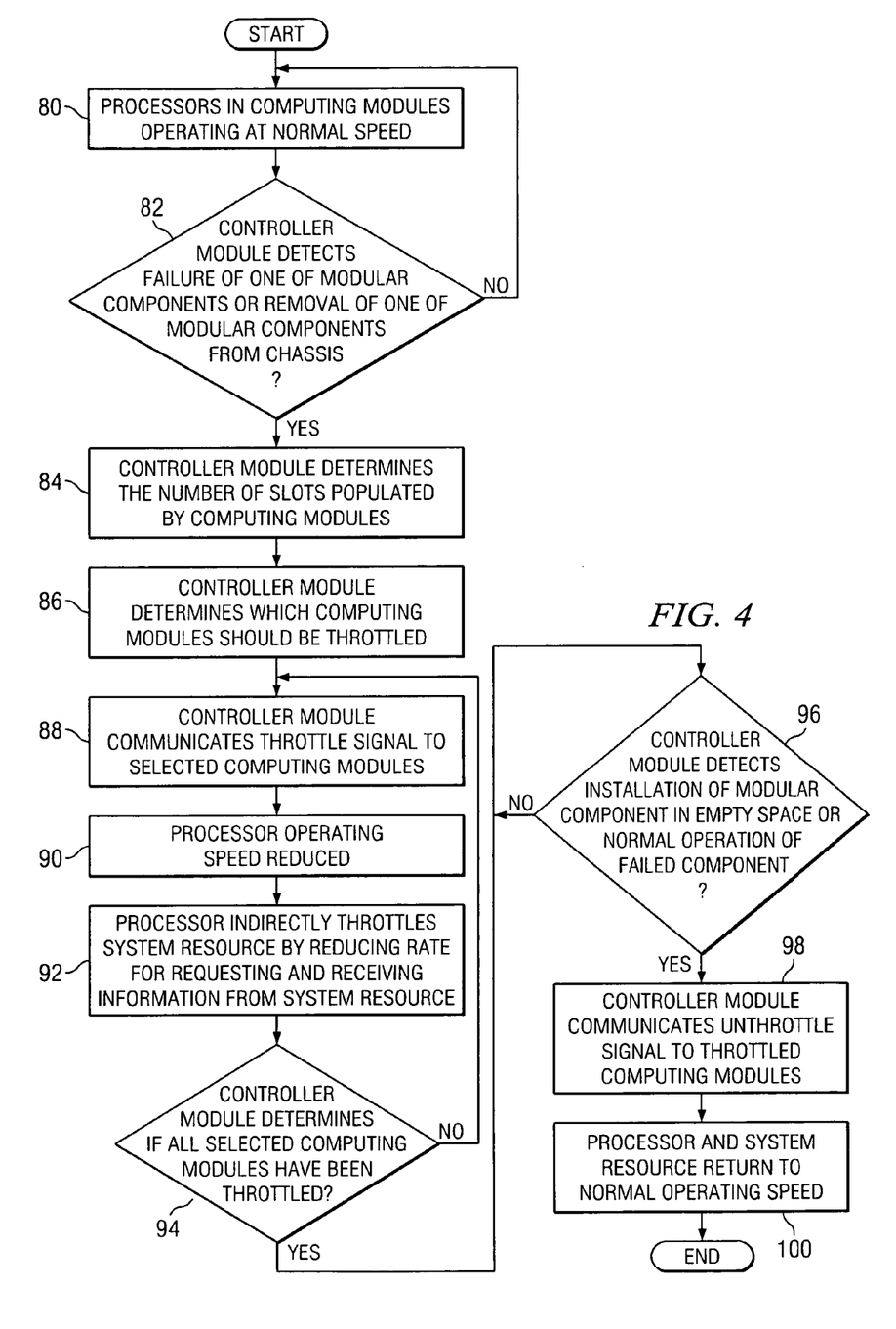
FIG. 4 illustrates a flow chart of a method for indirect throttling of a system resource by a processor in accordance with teachings of the present disclosure.

FIG. 4 illustrates a flow diagram of an example method for indirectly throttling a system resource. Generally, removal of one or more modular components from a chassis and/or the failure of a cooling device can cause installed computing modules to overheat because the amount of cooling air flowing over the computing components in the installed computing modules is reduced. A management module installed in the chassis may detect that one or more modular components have been removed or that one or more cooling devices have failed. The management module determines which of the installed computing modules may overheat due to the altered air flow and communicates a throttle signal to the selected computing modules. The throttle signal is used to throttle one or both of processors in the selected computing modules. The throttled processor has a reduced operating speed and, therefore, requests and receives information from system resources at a reduced rate. The system resources, therefore, are indirectly throttled and also operate at a reduced speed. The reduced operating speed of the processors and the system resources also reduces the ambient temperature in the computing module and may prevent the computing module from shutting down due to overheating.

At step 80, all modular components may be installed in modular chassis 14 and all cooling devices may be functioning properly such that processors 60 in computing modules 16 may be operating at a normal speed. Management module 48 may monitor the modular components to determine if one or more of the modular components has been removed from modular chassis 14, if one or more of cooling fans 40 has failed and/or if sensors 67 in one or more of computing modules 16 have measured temperatures above a maximum level at step 82. In one embodiment, a sensor, including but not limited to, optical switches such as an infra-red sensor, contact sensors, magnetic switches, or a continuity, may be used to determine if a modular component is installed in modular chassis 14. For example, if a sensor detects that a modular component has been removed from modular chassis, the sensor may generate an alarm and communicate the alarm to management module 48. In addition to indicating that a modular component has been removed, the alarm may indicate the position of the empty space in modular chassis 14. In another embodiment, the sensor may also indicate if a cooling device (e.g., cooling fans 40 and/or the fans in power supplies 42) has failed. The sensor may generate an alarm indicating the failure and communicate the alarm to management module 48 such that management module 48 may determine the location of the failed cooling device. In a further embodiment, the alarm may be generated by sensors 67 in one or more of computing modules 67 indicating that the measured temperature is above a maximum level. The alarm may be communicated to management module 48 such that management module 48 determines the location of the corresponding computing module.

If management module 48 does not detect that one of the modular components has been removed or that one of the cooling devices has failed, processors 60 in computing modules 16 continue to operate at normal speed at step 80. If management module 48 detects that at least one of the modular components has been removed from modular chassis 14 or that at least one of the cooling devices has failed, management module 48 determines the number of slots 20 populated by computing modules 16 at step 84. For example, as illustrated in FIG. 2A, modular chassis may include computing modules 16a-16f respectively installed in slots 20a-20f. In other embodiments, computing modules 16 may be installed in any number of slots 20 included in modular chassis 14. Management module 48 also may determine which computing modules 16 should be throttled to prevent overheating at step 86. In one embodiment, management module 48 may determine which of computing modules 16 should be throttled based on the position of the empty spaces and/or the position of the failed cooling device in modular chassis 14. For example, as illustrated in FIGS. 2A and 2B, modular chassis may include empty slot 20g and empty space 52. In other embodiments, modular chassis 14 may include fewer than two empty spaces or more than two empty spaces. Management module 48 may determine the position of the empty spaces and/or failed devices based on the electrical signals received from the sensors coupled to the slots for receiving each of the modular components. Although the steps have been described as being performed in a specific order, steps 84 and 86 may be performed in a different order or simultaneously.

At step 88, management module 48 communicates a throttle signal to each one of selected computing modules 16. The selection of computing modules 16 may be based on the number of computing modules 16 installed in modular chassis 14 and the position of the empty spaces and/or failed devices in modular chassis 14. In one embodiment, management module 48 may determine that all of installed computing modules 16a-16f should be throttled. In other embodiments, management module 48 may determine that a subset of computing modules 16a-16f should be throttled. In one embodiment, the throttle signal may be communicated to BMC 64 included in each one of selected computing modules 16. Once BMC 64 receives the throttle signal, BMC 64 may assert a throttle signal on one or both of processors 60. For example, processors 60 may be any type of Intel processor that include a FORCEPR# pin. When BMC 64 receives the throttle signal from management module 48, BMC 64 may force the FORCEPR# signal to an asserted state such that one or both of processors 60 are throttled. Each processor 60 that receives the throttle signal reduces its operating speed at step 90. The reduced operating speed may reduce the operating temperature of processors 60 and thus reduce the ambient temperature in selected computing modules 16.

At step 92, system resources, including but not limited to, memory 62 and peripheral devices 66, may be indirectly throttled by processors 60 because processors 60 reduce the frequency with which they request and receive information from memory 62 and peripheral devices 66. Thus, the effective throughput of memory 62 and peripheral devices 66 may be reduced, which also reduces the operating temperature of the devices. Therefore, the possibility that selected computing modules 16 will shut down due to a high operating temperature may be reduced or even eliminated.

At step 94, management module 48 determines if processors 60 in all of selected computing modules 16 have been throttled. In one embodiment, BMC 64 in computing module 16 may communicate a signal to management module 48 indicating that processors 60 are throttled. If management module 48 does not receive the signal from all of selected computing modules 16, management module 48 determines which one of computing modules 16 was not throttled and communicates throttle signal to selected computing modules 16 that have not been throttled at step 88. If management module 48 has received signals from all of selected computing modules 16, management module 48 determines if the modular components that were removed to create empty slot 20g and empty space 52 have been replaced and/or the failed cooling device is operating normally at step 96. If one of the modular components have not been replaced and/or one cooling device is not operating properly, processors 60, memory 62 and peripheral devices 66 may continue to operate at a reduced speed and management module 48 may continue to monitor whether the modular components have been replaced and/or the cooling device is operating properly at step 96.

If management module 48 detects that the modular components have been replaced and/or the cooling devices are operating properly, management module 48 communicates a signal to unthrottle processors 60 in selected computing modules 16 at step 98. In one embodiment, management module 48 may detect that the modular components have been replaced and/or that the cooling devices are operating properly based on a signal received from the sensors associated with the removed computing modules or the failed devices. For example, the sensors may deassert the signals associated with the removed modular components, which indicates that the modular components have been replaced. In one embodiment, the unthrottle signal may be communicated to BMC 64 for each of selected computing modules 16 and BMC 64 may communicate the signal to processors 60. For example, BMC 64 may force the FORCEPR # signal for processors 60 to a deasserted state, which instructs processors 60 to exit the throttle state. At step 100, processors 60, memory 62 and peripheral devices 66 return to normal operating speed.

Although the disclosed embodiments have been described in detail, it should be understood that various changes, substitutions and alterations can be made to the embodiments without departing from their spirit and scope.

What is claimed is:
1. An information handling system, comprising:
   a chassis operable to receive a plurality of modular components, each of the plurality of modular components comprising a processor and a system resource in communication with the processor; and
   a management module associated with the chassis, the management module operable to:
   receive an alarm indicating removal of one of the plurality of modular components from the chassis;

identify a particular modular component of the plurality of modular components at risk of overheating based on the removal of one of the plurality of modular components from the chassis;
generate a throttle signal that throttles operation of the processor of the particular modular component in response to identifying the particular modular component at risk of overheating;
wherein throttling operation of the processor reduces throughput of the system resource.

2. The system of claim 1, further comprising the reduced throughput of the system resource operable to decrease operating temperature of the system resource.

3. The system of claim 1, further comprising the plurality of modular components selected from the group consisting of blade servers, blank modules, cooling fans, power supplies, hard drives, I/O devices, keyboard, video, mouse (KVM) devices and any combination thereof.

4. The system of claim 1, further comprising the system resource selected from the group consisting of a chip set, a memory device, a graphics device, an audio device and a communication device.

5. The system of claim 1, further comprising the management module operable to deassert the throttle signal in response to the alarm being deasserted such that the processor increases the operating speed of the system resource.

6. The system of claim 1, wherein:
each of the plurality of modular components further comprises a controller in communication with the processor; and
generating a throttle signal that throttles operation of the processor comprises instructing the controller of the particular modular component to communicate the throttle signal to the processor in response to identifying the particular modular component at risk of overheating.

7. The system of claim 1, wherein the alarm further indicates failure of one of the plurality of modular components.

8. The system of claim 7, further comprising a sensor associated with each of the plurality of modular components, the sensor operable to detect the failure of one of the modular components or the removal of one of the plurality of modular component from the chassis.

9. The system of claim 1, the management module further operable to:
determine, based on the alarm, whether to generate a throttle signal or a fan speed signal, the fan speed signal resulting in an increase in an operational speed of a cooling fan.

10. A method for indirect throttling of a system resource by a processor, comprising:
receiving an alarm indicating removal from a chassis of one of a plurality of modular components, each of the plurality of modular components including a processor and a system resource in communication with the processor;
identifying a particular modular component of the plurality of modular components at risk of overheating based on the removal of one of the plurality of modular components from the chassis;
generating a throttle signal that throttles operation of a processor of the particular modular component in response to identifying the particular modular component at risk of overheating; and
reducing throughput of the system resource in communication with the processor in response to receiving the throttle signal.

11. The method of claim 10, wherein reducing throughput of a system resource comprises decreasing operating temperature of the system resource.

12. The method of claim 10, further comprising:
generating the throttle signal by a management module associated with the chassis in response to receiving the alarm; and
communicating the throttle signal to the processor by a controller in communication with the management module.

13. The method of claim 12, wherein the alarm further indicates failure of one of the modular components.

14. The method of claim 13, further comprising the plurality of modular components selected from the group consisting of blade servers, blank modules, cooling fans, power supplies, hard drives, I/O devices, keyboard, video, mouse (KVM) devices and any combination thereof.

15. The method of claim 10, further comprising the system resource selected from the group consisting of a chip set, a memory device, a graphics device, an audio device and a communication device.

16. The method of claim 10, further comprising:
receiving a deasserted throttle signal at the processor in response to the alarm being deasserted such that the processor is removed from throttling operation; and
increasing the operating speed of the system resource in response to receiving the deasserted throttle signal.

17. The method of claim 10, further comprising:
determining, based on the alarm, whether to generate a throttle signal or a fan speed signal, the fan speed signal resulting in an increase in an operational speed of a cooling fan.

18. A system for indirect throttling of a system resource by a processor, comprising:
a modular chassis including a plurality of modular components and a plurality of blade servers, each of the plurality of blade servers including a processor, a system resource in communication with the processor, and a controller in communication with the processor;
a management module associated with the chassis and operably coupled to the blade servers and the modular components, the management module operable to:
receive an alarm indicating removal of one of the plurality of modular components from the chassis or removal of one of the plurality of blade servers from the chassis;
identify a particular blade server of the plurality of blade servers at risk of overheating due to the removal of one of the plurality of modular components from the chassis or removal of one of the plurality of blade servers from the chassis;
generate a throttle signal that throttles operation of the processor of the particular blade server in response to identifying the particular blade server at risk of overheating;
wherein the controller is operable to receive the throttle signal from the management module and throttle operation of the processor;
wherein throttling operation of the processor reduces throughput of the system resource.

19. The system of claim 18, wherein reducing throughput of a system resource comprises decreasing operating temperature of the system resource.

20. The system of claim 18, further comprising the plurality of modular components selected from the group consisting of blank modules, cooling fans, power supplies, hard drives, I/O devices, keyboard, video, mouse (KVM) devices and any combination thereof.

21. The system of claim 18, further comprising the system resource selected from the group consisting of a chip set, a memory device, a graphics device, an audio device and a communication device.

22. The system of claim 18, wherein the alarm further indicates failure of one of the plurality of modular components or failure of one of the plurality of blade servers.

23. The system of claim 22, wherein the management module identifies the particular blade server at risk of overheating by determining a position of at least one of the failed modular component, an empty space created by removal of one of the modular components, or an empty slot created by removal of one of the blade servers.

* * * * *